(12) United States Patent
Iwase et al.

(10) Patent No.: US 11,806,741 B2
(45) Date of Patent: Nov. 7, 2023

(54) SPRAY DEVICE AND SPRAY COATING METHOD

(71) Applicant: FUJIFILM Corporation, Tokyo (JP)

(72) Inventors: Eijiro Iwase, Minamiashigara (JP); Yasushi Kikuchi, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 18 days.

(21) Appl. No.: 17/583,557

(22) Filed: Jan. 25, 2022

(65) Prior Publication Data

US 2022/0143634 A1 May 12, 2022

Related U.S. Application Data

(63) Continuation of application No. PCT/JP2020/023146, filed on Jun. 12, 2020.

(30) Foreign Application Priority Data

Jul. 26, 2019 (JP) .................. 2019-138189

(51) Int. Cl.
*B05B 7/08* (2006.01)
*B05B 7/16* (2006.01)
*B05B 17/06* (2006.01)
*B05D 1/02* (2006.01)

(52) U.S. Cl.
CPC ................ *B05B 7/08* (2013.01); *B05B 7/168* (2013.01); *B05B 17/06* (2013.01); *B05D 1/02* (2013.01)

(58) Field of Classification Search
CPC ........... B05B 7/08; B05B 7/168; B05B 17/06; B05D 1/02
See application file for complete search history.

(56) References Cited

U.S. PATENT DOCUMENTS

| 6,157,774 A | 12/2000 | Komino et al. |
| 8,505,516 B2 | 8/2013 | Cheiky |
| 2011/0062249 A1 | 3/2011 | Beheshti et al. |
| 2018/0047607 A1 | 2/2018 | Busche et al. |

(Continued)

FOREIGN PATENT DOCUMENTS

| CN | 1206091 A | 1/1999 |
| CN | 101309728 A | 11/2008 |

(Continued)

OTHER PUBLICATIONS

Chinese Office Action and Search Report for corresponding Chinese Application No. 202080053219.1, dated Oct. 21, 2022, with English translation.

(Continued)

*Primary Examiner* — Nathan T Leong
(74) *Attorney, Agent, or Firm* — Birch, Stewart, Kolasch & Birch, LLP

(57) ABSTRACT

An object of the present invention is to provide a spray device that can separately apply a coating liquid, and can form a dense organic substance film having high uniformity, and a spray coating method. To achieve the object, the spray device includes: a spray; an air flow forming unit that forms an air flow for restricting a flying space of a coating liquid sprayed by the spray; and a space heating unit that heats the flying space of the coating liquid from outside of the air flow formed by the air flow forming unit.

1 Claim, 5 Drawing Sheets

(56) References Cited

U.S. PATENT DOCUMENTS

2018/0297853 A1 10/2018 Jang et al.
2019/0210060 A1 7/2019 Li
2020/0038894 A1 2/2020 Ikushima

FOREIGN PATENT DOCUMENTS

| CN | 101415918 A | | 4/2009 |
|----|----|----|----|
| CN | 108941590 A | | 12/2018 |
| CN | 109414718 A | | 3/2019 |
| CN | 109789435 A | | 5/2019 |
| JP | 5-888 A | | 1/1993 |
| JP | 2008-243421 A | | 10/2008 |
| JP | 2009-289629 A | | 12/2009 |
| JP | 2009-289692 A | | 12/2009 |
| JP | 2010-87198 A | | 4/2010 |
| JP | 2009289692 | * | 12/2010 |
| JP | 2010087198 | * | 4/2015 |
| TW | 201543011 A | | 11/2015 |

OTHER PUBLICATIONS

International Preliminary Report on Patentability and English translation of the Written Opinion of the International Searching Authority for International Application No. PCT/JP2020/023146, dated Feb. 10, 2022.
International Search Report for International Application No. PCT/JP2020/023146, dated Aug. 18, 2020, with English translation.
Japanese Office Action for Japanese Application No. 2021-536649, dated Jul. 12, 2022, with English translation.

* cited by examiner

SPRAY DEVICE AND SPRAY COATING METHOD

CROSS-REFERENCE TO RELATED APPLICATIONS

This application is a Continuation of PCT International Application No. PCT/JP2020/023146 filed on Jun. 12, 2020, which claims priority under 35 U.S.C. § 119(a) to Japanese Patent Application No. 2019-138189 filed on Jul. 26, 2019. The above application is hereby expressly incorporated by reference, in its entirety, into the present application.

BACKGROUND OF THE INVENTION

1. Field of the Invention

The present invention relates to a spray device which is used for forming films of various materials or the like, and a spray coating method.

2. Description of the Related Art

Next-generation electronics materials have prospered primarily in semiconductor technologies.

As we face the era of high-speed communication and trillion sensors, there is a need for technologies such as printing and coating, that require no expensive equipment and allow anyone to easily produce electronics devices. This makes on-demand production and manufacturing of a wide variety of products in small quantities possible, and technologies can be further developed and permeated.

However, materials, functional layers, and the like used in these electronics devices are originally inorganic substances. Accordingly, in order to form a film or the like constituting an electronics device, a vacuum film forming device is required, and production equipment costs a lot of money.

In order to solve the problems, attempts have been made to replace the inorganic substance with an organic substance or to convert the inorganic substance to an organic-inorganic hybrid material.

For example, in cases of semiconductors, it has been considered to use an organic semiconductor material instead of a silicon-based material according to the related art. It has also been considered to use a fluorine-based polymer, polysilazane, and the like as an insulating film and the like, instead of silicon oxide, silicon nitride, alumina (aluminum oxide), and the like used as an insulating film, a gas barrier film, and the like.

By the conversion of the materials, it has been tried to realize the formation of a film by coating, printing, or the like in the air using a coating liquid (paint) prepared by dissolving an organic substance in a solvent, rather than the vacuum film formation using an inorganic substance.

However, a film formed by using an organic substance is inferior in performance to an inorganic substance film formed by a vacuum device. There are several reasons for this, and three primary reasons are as follow.

The first reason is that the molecular structure for exhibiting the original film performance and the molecular structure for the properties of dissolving in the solvent and becoming a liquid in order to prepare the coating liquid contradict the original properties.

For example, in order to allow an organic semiconductor to exhibit high mobility, it is desirable that organic semiconductor molecules are regularly or uniformly arranged in granular lumps. For this, the organic semiconductor is required to have high self-aggregating properties. However, the high self-aggregating properties mean that there is difficulty in dissolving in the preparation of the coating liquid. Meanwhile, in a case where the organic semiconductor has a structure that easily dissolves and the structure is changed by drying for a long period of time, the molecules may not be arranged according to the molecular arrangement for properly exhibiting the original performance.

The second reason is that in order to form a thin film, it is necessary to dilute the coating liquid until the concentration of the organic substance is low. That is, in the formation of a film by coating, printing, or the like, it is difficult to form a thin film in a case where the concentration of solid contents of the coating liquid is not sufficiently low. As a result, a large amount of the residual solvent remains in the film formed by the organic substance and becomes impurities, that inhibit the film from exhibiting its proper function.

For example, a film of a fluoropolymer such as OPTOOL manufactured by DAIKIN INDUSTRIES, Ltd, that is used as an insulating film, preferably has a film thickness of 1 µm or less, and more preferably 100 nm or less. In such a thin film, film defects occur in a case where the film is not formed with a low-viscosity coating liquid in which the organic substance is sufficiently diluted. For this, the amount of the solvent of the coating liquid used for forming the film is required to be 90 mass % or more.

The third reason is that, on the contrary, in a case where the concentration of the coating liquid is increased, the reactivity between oxygen and the like in the air and the organic substance increases, and the organic substance easily forms self-aggregates. In a case where the organic substance forms self-aggregates in the coating liquid, a uniform (homogeneous) film cannot be formed.

For example, polysilazane is a solution, and in a case where it is thinly coated and heated, a $SiO_2$ film can be formed. Inorganic polysilazane with an increased amount of Si can form a film very close to $SiO_2$, and is excellent in insulating properties, barrier properties, and the like. However, as the proportion of the inorganic substance in the coating liquid is increased, dehydration condensation proceeds due to the reaction with oxygen and gelation occurs. As a result, this directly leads to the problem that the pot life of the coating liquid is shortened. In a case where the ratio of the organic substance is increased to solve the problem, the number of carbon atoms in the film is increased, and the required performance such as insulating properties and barrier properties is significantly reduced. Diluting the coating liquid used for forming the film is also considered, but the same inconvenience as the second reason described above occurs.

That is, the formation of an organic substance film by coating, printing, or the like has new problems in that the organic substance cannot be easily dissolved in the coating liquid, the solvent is not easily removed in a case where the concentration of the organic substance of the coating liquid is reduced to dissolve the organic substance, and it is difficult to control the reactivity of the organic substance in the preparation of the coating liquid.

These problems cannot be dealt with only by the development of coating devices, ink jet devices, and the like, and become a factor that hinders the development of printed electronics and the like.

Examples of methods capable of solving the problems include a method of forming a film by spraying a coating liquid using a spray.

Specifically, in the method of forming a film by spraying, a coating liquid prepared by dissolving an organic substance in a solvent is prepared, a solvent is removed from the coating liquid that is in a state of flying mist by being sprayed, and a thin organic substance film is formed on a substrate.

For example, JP2009-289629A illustrates a method of forming an electrode layer for a fuel cell by applying a catalyst ink containing catalyst-carrying particles, an ion conductive polymer, and a solvent to a target by an ultrasonic spray device, in which ink particles are dried so as to adhere to a surface of the target in a state in which the ink particles sprayed from the ultrasonic spray device are dried.

In addition, JP2010-087198A describes a resist coating device including: a wafer mounting portion that is provided with a heater that heats a wafer substrate; an ultrasonic spray nozzle that turns a resist liquid into a mist and forms an air curtain around the mist-like resist liquid to spray the mist onto the wafer substrate; and an actuator that ejects the mist-like resist from the ultrasonic spray nozzle in the form of skirt, and relatively moves the ultrasonic spray nozzle with respect to the wafer substrate so that skirt-like hem parts of the mist-like resist on adjacent spray movement tracks of the ultrasonic spray nozzle overlap with each other.

SUMMARY OF THE INVENTION

According to the study by the inventors, in the formation of an organic substance film by spraying using such an ultrasonic spray or the like, the solvent can be removed from the coating liquid by heating the coating liquid in a state of flying mist. Therefore, the concentration of the organic substance in the coating liquid can be increased at the time when the coating liquid adheres to the substrate, and the film can be formed by rapid drying. As a result, a thin film in which the organic substance exhibits its original performance can be obtained.

Here, the method described in JP2009-289629A is excellent from

DESCRIPTION OF THE PREFERRED EMBODIMENTS

Hereinafter, a spray device and a spray coating method according to the embodiment of the present invention will be described in detail based on preferable embodiments shown in the accompanying drawings.

In the present invention, a numerical range expressed using "to" means a range including numerical values before and after "to" as a lower limit and an upper limit.

Figure 1:
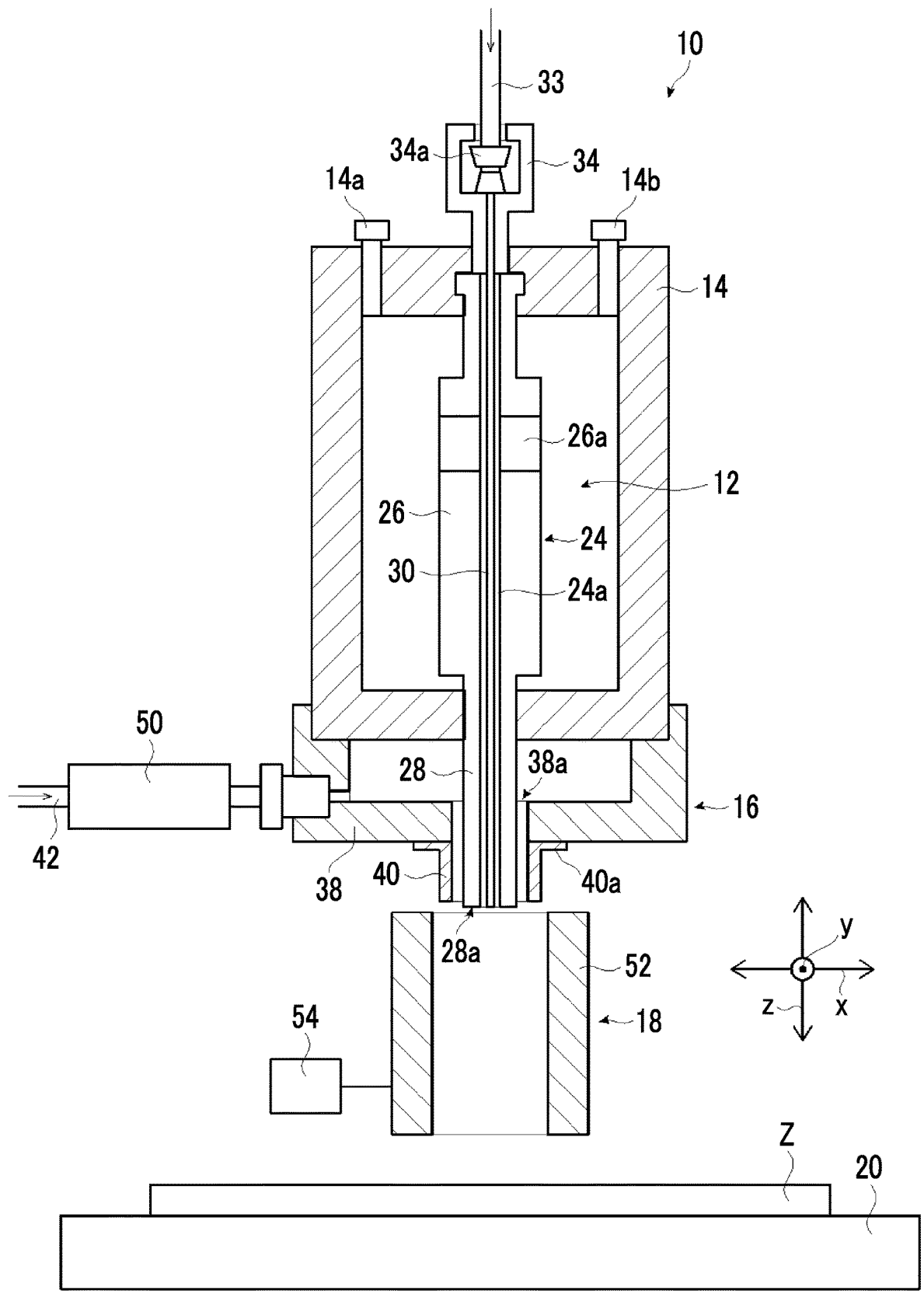

FIG. 1 shows a partial cross-sectional view schematically showing an example of a spray device according to the embodiment of the present invention that performs a spray coating method according to the embodiment of the present invention.

The drawings shown below, including FIG. 1, schematically show the spray device according to the embodiment of the present invention. Therefore, in the following drawings, the size, shape, position, size relationship, positional relationship, and the like of each member do not necessarily match those of the actual spray device according to the embodiment of the present invention.

A spray device 10 shown in FIG. 1 includes an ultrasonic spray 12, a casing 14, an air flow forming portion 16, a space heating portion 18, and a substrate holder 20.

The spray device 10 according to the embodiment of the present invention is a device that forms a film on a substrate Z by performing spray coating on the substrate Z with a coating liquid prepared by dissolving a material to be formed as a film in a solvent. The substrate Z is a coating material to be coated with the coating liquid in the present invention.

Specifically, the spray device 10 performs spray coating on the substrate Z with the coating liquid while restricting the flying space of the coating liquid sprayed by the ultrasonic spray 12 by the air flow formed by the air flow forming portion 16. In addition, the spray device 10 performs spray coating on the substrate Z with the coating liquid while heating the flying space of the coating liquid restricted by the air flow forming portion 16 from the outside of the air flow formed by the air flow forming portion 16.

In a case where the spray device 10 according to the embodiment of the present invention has such a configuration, a dense organic substance film having good uniformity can be formed with good controllability allowing separative application and the like.

The substrate Z on which the film is formed by the spray device 10 according to the embodiment of the present invention, that is, the substrate Z to which the coating liquid is applied by the spray device 10 according to the embodiment of the present invention is not limited, and various types can be used.

Examples thereof include resin films such as a polyethylene terephthalate (PET) film and a polyethylene naphthalate (PEN) film, glass plates, and silicon wafers.

In addition, the substrate Z on which the film is formed by the spray device 10 according to the embodiment of the present invention is also not limited to a sheet-like material (plate-like material) such as a resin film. That is, the spray device 10 (spray coating method) according to the embodiment of the present invention may form a film on objects having various shapes such as a sphere, a rectangular parallelepiped, a columnar body, a conical body, and an amorphous object.

The film formed by the spray device 10 according to the embodiment of the present invention may be a raw material, an intermediate product, or a finished product.

The spray device 10 according to the embodiment of the present invention forms a film on a surface of the substrate Z by performing spray coating on the substrate Z with the coating liquid.

The coating liquid (paint) is prepared by dissolving a material (film forming material) to be formed as a film on the substrate Z in a solvent.

The film formed by the spray device 10 according to the embodiment of the present invention is not limited, and various materials can be used as long as these can be dissolved in the solvent. Examples thereof include organic semiconductor materials such as 6,13-bis(triisopropylsilylethynyl)pentacene (TIPS-pentacene) and dioctyl benzothieno benzothiophene (C8-BTBT), insulating materials such as fluorine-based polymers and polysilazane, and materials to be a gas barrier film. The spray device 10 according to the embodiment of the present invention can form a uniform and dense film with good controllability even in a case where an organic substance having low solubility in the solvent is used. Accordingly, the spray device 10 according to the embodiment of the present invention can be more preferably used for the formation of an organic substance film.

The solvent used for the coating liquid is also not limited, and a solvent capable of dissolving the material of the film may be appropriately selected according to the material of the film to be formed.

Furthermore, the concentration (concentration of solid contents) of the coating liquid is also not limited, and may be appropriately set according to the material of the film to be formed, the solvent, the solubility of the material of the film to be formed, and the like.

The coating liquid may be prepared in the same manner as in the preparation of a known solution obtained by putting a material of a film in a solvent, performing stirring, and dissolving the material in the solvent.

Preferably, the coating liquid is prepared by heating the solvent (coating liquid). Accordingly, the concentration of the film forming material in the coating liquid can be made higher than that in a coating liquid prepared at normal temperature.

The substrate holder 20 holds the substrate Z.

As the substrate holder 20, known various types can be used according to the shape of the substrate Z on which the film is formed and the like as long as the substrate Z can be held. For example, in a case where the substrate Z is a sheet-like material, examples of the substrate holder 20 include a placing stand on which the substrate Z is placed.

The spray device 10 preferably has a substrate heating unit (coating material heating unit) that heats the substrate Z held by the substrate holder 20.

By providing the substrate heating unit, the solvent of the coating liquid adhering to the substrate Z can be rapidly evaporated, and a film having high uniformity can be formed with good productivity.

The substrate heating unit is not limited, and known various types can be used according to the shape of the substrate Z and the like. For example, in a case where the substrate Z is a sheet-like material, examples thereof include a method using a hot plate as the substrate holder 20. In addition, examples of the substrate heating unit also include a heating unit using radiation heat generated by using a heater such as an infrared heater or a halogen lamp, and a heating unit that heats the substrate Z by heating the substrate holder 20.

The heating temperature of the substrate Z by the substrate heating unit may be appropriately set according to the heat resistance of the substrate Z, the durability of the film to be formed on the substrate Z, the boiling point of the solvent used for the coating liquid, and the like.

The ultrasonic spray 12 is a spray that sprays the coating liquid to the substrate Z according to the present invention.

In the present invention, the spray is not limited to the ultrasonic spray 12. That is, in the present invention, known various sprays (liquid spray unit, atomizer) can be used as the spray as long as a required amount of liquid droplets having a desired size can be sprayed in the form of mist according to the material of the film to be formed, the state of the coating liquid such as the concentration, the type of the substrate Z, and the like. In the spray device according to the embodiment of the present invention, the spray also includes units generally called a liquid jetting unit or the like.

Examples of the spray include, in addition to the ultrasonic spray 12 in the example shown in the drawing, a two-fluid spray, an electric field spray (electrospray), an electrostatic spray, and an ink jet head. Among these, spray units (one-fluid spray) that spray only liquid droplets, such as an ultrasonic spray, an electric field spray, and an electrostatic spray, are preferable from the viewpoint that no gas is required for spraying and the spray space of mist-like liquid droplets can be controlled by an air flow. Among these, the ultrasonic spray 12 in the example shown in the drawing is particularly preferable.

In the example shown in the drawing, the ultrasonic spray 12 has a housing 24, a coating liquid flow path pipe 30, and an ultrasonic oscillation generating portion 26a.

The housing 24 is a cylindrical member having two regions having different outer diameters, and has a body portion 26 having a large outer diameter and a nozzle portion 28 having a small outer diameter. The nozzle portion 28 is on the coating liquid spray side.

In addition, as described above, the housing 24 is cylindrical and has a circular through hole 24a at a center thereof. The cylindrical coating liquid flow path pipe 30 is inserted in the through hole 24a so that their centers coincide.

The coating liquid flow path pipe 30 is connected and fixed to a coating liquid supply pipe 33 by a connecting member 34a.

The coating liquid is supplied from the supply pipe 33 to the coating liquid flow path pipe 30 of the ultrasonic spray 12. The coating liquid flows through the coating liquid flow path pipe 30 and reaches a distal end of the nozzle portion 28 of the housing 24, that is, a distal end surface 28a of the ultrasonic spray 12.

For the supply of the coating liquid to the supply pipe 33, known various liquid supply units such as a method using a pump can be used.

The spray device 10 has a coating liquid heating portion 34 for heating the coating liquid.

The supply pipe 33 is connected to the coating liquid flow path pipe 30 by the connecting member 34a in the coating liquid heating portion 34. Accordingly, the coating liquid supplied from the supply pipe 33 is heated in the coating liquid heating portion 34 and supplied to the coating liquid flow path pipe 30 of the ultrasonic spray 12.

In a case where the coating liquid is prepared by heating and supplied after being heated in the coating liquid heating portion 34, the coating liquid having a high concentration can be supplied to the ultrasonic spray 12 even in a case where the solubility of the material of the film to be formed is low.

The method of heating the coating liquid by the coating liquid heating portion 34 is not limited, and known various methods can be used. Examples thereof include heating by radiation heat using a heater such as an infrared heater or a halogen lamp, a method in which a ribbon heater is wound around the supply pipe 33 and/or the connecting member 34a, and heating of the supply pipe 33 by a circulating heat medium.

The heating temperature of the coating liquid by the coating liquid heating portion 34 is also not limited, and may be appropriately set according to the solvent contained in the coating liquid, the film forming material, the concentration of the coating liquid, and the like.

As described above, the housing 24 (body portion 26 and nozzle portion 28) is cylindrical. In addition, the cylindrical coating liquid flow path pipe 30 is inserted into the circular through hole 24a at the center of the housing 24 so that their centers coincide.

Accordingly, the distal end surface 28a of the ultrasonic spray 12 formed by a distal end surface of the housing 24 (nozzle portion 28) and a distal end surface of the coating liquid flow path pipe 30 has a circular shape. That is, the liquid pool (atomizing surface) of the ultrasonic spray 12 formed by the distal end surface of the housing 24 and the distal end surface of the coating liquid flow path pipe 30 is circular.

The coating liquid supplied to the coating liquid flow path pipe 30 reaches the distal end surface 28a of the ultrasonic spray 12 through the coating liquid flow path pipe 30, and spreads on the distal end surface 28a. The coating liquid is atomized and sprayed in the distal end surface 28a of the ultrasonic spray 12 by the ultrasonic oscillation of the housing 24.

In the spray device 10 according to the embodiment of the present invention, the shape of the distal end surface 28a (liquid pool) of the ultrasonic spray 12 is not limited to a circular shape. That is, in the spray device 10 according to the embodiment of the present invention, the shape of the atomizing surface of the ultrasonic spray (ultrasonic spray nozzle) is not limited to a circular shape.

Accordingly, various shapes such as an elliptical shape and a polygonal shape can be used as the shape of the distal end surface 28a of the ultrasonic spray 12. However, the distal end surface 28a of the ultrasonic spray 12 is preferably circular from the viewpoint that the coating liquid can be uniformly spread on the whole distal end surface 28a of the ultrasonic spray 12.

In the ultrasonic spray 12, the ultrasonic oscillation generating portion 26a (ultrasonic oscillator) is incorporated in the body portion 26 of the housing 24.

In the ultrasonic spray 12, the housing 24 (body portion 26 and nozzle portion 28) is ultrasonically oscillated by the ultrasonic oscillation generated by the ultrasonic oscillation generating portion 26a. Accordingly, the coating liquid spread on the distal end surface 28a of the ultrasonic spray 12 that is an atomizing surface is ultrasonically oscillated and sprayed in the form of mist.

A gap is provided between the coating liquid flow path pipe 30 and the housing 24. By providing the gap, only the housing 24 is oscillated.

In the spray device 10 according to the embodiment of the present invention, the ultrasonic spray 12 is not limited. That is, known various ultrasonic sprays (ultrasonic atomizer) that atomize the coating liquid spread on the distal end surface 28a by ultrasonic oscillation and spray the coating liquid in the form of mist can be used as the ultrasonic spray 12. Accordingly, in the present invention, the ultrasonic spray 12 is not limited by the forming material.

In addition, commercially available products can also be preferably used as the ultrasonic spray 12. Examples of commercially available products for the ultrasonic spray 12 include AccuMist, MicroMist, Impact, Vortex, and Propel manufactured by SONO-TEK Corporation.

The ultrasonic spray 12 is held in the casing 14.

The casing 14 is, for example, a hollow columnar member whose upper and lower surfaces are closed. A through hole is formed in the upper and lower surfaces of the column of the casing 14. The ultrasonic spray 12 is held in the casing 14 by inserting and holding a portion of the spray near an end portion on the side of the supply pipe 33 and the nozzle portion 28 into the through hole.

An end surface of the casing 14 on the side of the supply pipe 33 is provided with an inflow port 14a and a discharge port 14b for allowing air (air for heating or cooling) for adjusting temperatures of the ultrasonic oscillation generating portion 26a and the casing 14 to flow.

In the spray device 10, the air flow forming portion 16 is provided in an end surface of the casing 14 on the side of the substrate Z, that is, on the coating liquid spray side.

The air flow forming portion 16 has a chamber 38 and an air flow forming pipe 40.

The chamber 38 is a hollow columnar member fixed to the casing 14 and having one opening surface (upper surface). The opening surface of the chamber 38 is closed by the end surface of the casing 14 on the side of the substrate Z.

In addition, a circular opening 38a having a diameter larger than that of the nozzle portion 28 of the housing 24 of the ultrasonic spray 12 is formed in the closed surface (end surface on the side of the substrate Z) of the chamber 38.

The cylindrical air flow forming pipe 40 is fixed to a lower surface of the chamber 38. Centers of the opening 38a and the air flow forming pipe 40 coincide. The diameter of the opening 38a of the chamber 38 and the diameter of the through hole (inner diameter) of the air flow forming pipe 40 may or may not coincide.

The air flow forming pipe 40 has a flange portion 40a protruding outward at an end portion thereof on the side of the chamber 38. By fixing the flange portion 40a to the lower surface of the chamber 38, the air flow forming pipe 40 is fixed to the chamber 38.

The nozzle portion 28 of the ultrasonic spray 12 is inserted into the opening 38a and the through hole of the air flow forming pipe 40.

As described above, the opening 38a and the through hole of the air flow forming pipe 40 are circular. In addition, the nozzle portion 28 of the ultrasonic spray 12 is cylindrical and has a diameter smaller than that of the opening 38a or the like. The nozzle portion 28 of the ultrasonic spray 12 is inserted into the opening 38a and the air flow forming pipe 40 so that their centers coincide.

Accordingly, between: the nozzle portion 28; and the opening 38a and the air flow forming pipe 40, voids are formed at uniform intervals over the whole circumference surrounding the nozzle portion 28.

A supply pipe 42 is connected to a side surface of the chamber 38. An air flow forming gas is supplied into the chamber 38 from the supply pipe 42.

The air flow forming gas supplied into the chamber 38 is discharged between: the nozzle portion 28; and the opening 38a and the air flow forming pipe 40. That is, in the spray device 10, the nozzle portion 28 of the ultrasonic spray 12 also constitutes a part of the air flow forming portion 16.

In addition, by providing the cylindrical air flow forming pipe 40 into which the nozzle portion 28 is inserted, an air flow forming the flying space of the coating liquid can be formed and controlled with high accuracy.

As described above, the nozzle portion 28 is cylindrical, and the opening 38a and the through hole of the air flow forming pipe 40 are circular. Accordingly, the air flow forming gas discharged between: the nozzle portion 28; and the opening 38a and the air flow forming pipe 40 becomes a cylindrical air flow surrounding the nozzle portion 28.

That is, in the spray device 10, a cylindrical air flow (gas curtain, shaping air) surrounding the nozzle portion 28 is formed from the nozzle portion 28 toward the substrate Z.

A spiral groove may be optionally formed in the direction of spraying of the coating liquid in the outer circumferential surface of the nozzle portion 28 and/or the inner circumferential surface of the air flow forming pipe 40.

Accordingly, the cylindrical air flow discharged between the nozzle portion 28 and the air flow forming pipe 40 travels while revolving, so that the straight-advancing properties of the air flow can be improved.

The coating liquid is sprayed from the distal end surface 28a of the ultrasonic spray 12. The coating liquid to be sprayed is atomized by ultrasonic oscillation, and does not contain a spraying gas or the like.

Accordingly, by the cylindrical air flow surrounding the nozzle portion 28, the flying space of the coating liquid sprayed by the ultrasonic spray 12 can be restricted within the cylindrical air flow.

The cylindrical air flow acts only on the restriction of the flying space of the coating liquid sprayed by the ultrasonic spray 12, and basically does not contribute to the spraying of the coating liquid from the ultrasonic spray 12. That is, the spraying of the coating liquid from the ultrasonic spray 12 is performed only by the ultrasonic oscillation of the ultrasonic spray 12.

In addition, by adjusting the air flow formed by the air flow forming portion 16, a region to be coated with the coating liquid sprayed by the ultrasonic spray 12 can be restricted.

For example, the region to be coated with the coating liquid on the substrate Z can be narrowed by reducing the inner diameter of the cylindrical air flow. On the contrary, the region to be coated with the coating liquid on the substrate Z can be widened by increasing the inner diameter of the cylindrical air flow. The inner diameter of the cylindrical air flow may be adjusted by known methods such as adjusting the outer diameter (maximum diameter) of the side surface of the ultrasonic spray 12, adjusting the direction of spraying of the air flow, and selecting the shape of the air flow forming pipe 40 on the gas discharge side such as expanding or reducing the diameter.

Accordingly, according to the spray device 10 according to the embodiment of the present invention, the coating liquid can be separately applied with good controllability.

For example, according to the spray device 10 according to the embodiment of the present invention, the selective formation of a film in a desired region on the substrate Z or the like can also be performed with high accuracy and controllability.

The shape of the air flow formed by the air flow forming portion 16 to restrict the flying space of the coating liquid sprayed by the ultrasonic spray 12 is not limited to a cylindrical shape as shown in the example shown in the drawing.

For example, the air flow restricting the flying space of the coating liquid may have a truncated cone-like tubular shape whose diameter is reduced or expanded.

In addition, the air flow forming pipe 40 may have an angular tubular shape such as a rectangular tubular shape or a hexagonal tubular shape. Here, as described above, the distal end surface 28a of the ultrasonic spray 12 is preferably circular. In a case where the distal end surface 28a of the ultrasonic spray 12 is circular and the air flow forming pipe 40 has an angular tubular shape such as a hexagonal tubular shape, regions having different distances, that is, gaps are generated between the distal end surface 28a of the ultrasonic spray 12 and the air flow forming pipe 40. In this case, regions having different air flow velocities are partially generated due to the difference in gap between the distal end surface 28a of the ultrasonic spray 12 and the air flow forming pipe 40, and may affect the flying of the coating liquid. Accordingly, the air flow forming pipe 40 preferably has a cylindrical shape whose center coincides with that of the ultrasonic spray 12.

In the spray device 10 in the example shown in the drawing, the distal end surface 28a of the ultrasonic spray 12 slightly protrudes from the distal end portion of the air flow forming pipe 40, but the present invention is not limited thereto.

That is, in the spray device 10, the distal end surface 28a of the ultrasonic spray 12 may be positioned inside the air flow forming pipe 40. Otherwise, in the spray device 10, the position of the distal end surface 28a of the ultrasonic spray 12 may coincide with that of the distal end portion of the air flow forming pipe 40 in the direction of spraying of the coating liquid.

Furthermore, in the spray device 10, the ultrasonic spray 12 and the air flow forming pipe 40 may be relatively movable in the direction of spraying of the coating liquid by the ultrasonic spray 12.

In this case, the air flow forming pipe 40 and/or the nozzle portion 28 may have a shape that is gradually reduced or expanded in diameter. Accordingly, by adjusting the gap between the distal end surface 28a of the ultrasonic spray 12 and the air flow forming pipe 40 by the relative movement between the ultrasonic spray 12 and the air flow forming pipe 40, the air flow rate can be adjusted.

In the spray device according to the embodiment of the present invention, the air flow forming unit is not limited to the configuration formed of the ultrasonic spray 12 and the tubular body surrounding the ultrasonic spray 12.

For example, a double pipe provided with a gas flow channel between the pipes may be used as the air flow forming unit. In this case, in a case where the flying space of the coating liquid can be restricted by the air flow formed, the distal end surface 28a of the ultrasonic spray 12 may or may not be inserted in the inner pipe in the double pipe.

In addition, a plurality of nozzles that supply a gas may be provided so as to surround the nozzle portion 28 of the ultrasonic spray 12 in a circumferential direction in order to constitute the air flow forming unit.

That is, in the spray device according to the embodiment of the present invention, the air flow forming unit is not limited to the aspect in which the ultrasonic spray 12 is a part of the configuration requirements. In addition, in the spray device according to the embodiment of the present invention, the shape of the air flow formed by the air flow forming unit is not limited to a tubular shape.

In the spray device according to the embodiment of the present invention, the air flow formed by the air flow forming unit is not limited in shape, state, and the like as long as the flying space of the coating liquid sprayed by the ultrasonic spray 12 can be restricted. In addition, in the spray device according to the embodiment of the present invention, the air flow forming unit can use various configurations as long as an air flow that can restrict the flying space of the coating liquid can be formed.

The gas forming the air flow formed by the air flow forming portion 16 is not limited. Here, the gas forming the air flow preferably does not affect the coating liquid. In consideration of this fact, air or an inert gas such as nitrogen or helium is preferably used as the gas forming the air flow.

In addition, the velocity of the air flow restricting the flying space of the coating liquid is not limited. That is, regarding the velocity of the air flow restricting the flying space of the coating liquid, the flow rate may be appropriately set according to the amount of the coating liquid to be sprayed by the ultrasonic spray 12 and the like so that the flying space of the coating liquid can be restricted. As described above, the spraying of the coating liquid by the ultrasonic spray 12 is performed by the atomization of the coating liquid by ultrasonic oscillation, and the propulsive force of the coating liquid atomized is not so strong. Accordingly, the air flow restricting the flying space of the coating liquid may be a mild air flow flowing at a low velocity.

As a preferable aspect, the spray device 10 in the example shown in the drawing has a gas heating portion 50 that heats a gas in the middle of the supply pipe 42 that supplies the gas forming the air flow to the chamber 38.

By providing the gas heating portion 50, the temperature of the air flow restricting the flying space of the coating liquid can be increased, and thus the efficiency of heating the flying space of the coating liquid by the space heating portion 18 to be described later can be improved. As a result, it is possible to more preferably improve the film forming rate, make a film to be formed uniform, and improve a density of the film to be formed.

The heating of the gas by the gas heating portion 50 is not limited, and known methods can be used.

Examples thereof include a method using a commercially available (small amount) gas heater, heating by radiation heat using a heater such as an infrared heater or a halogen lamp, a method in which a ribbon heater is wound around the supply pipe 42, and heating of the supply pipe 42 by a circulating heat medium (gas or liquid).

The heating temperature of the gas by the gas heating portion 50 is also not limited, and may be appropriately set according to the solvent contained in the coating liquid, the film forming material, the concentration of the coating liquid, and the like.

The spray device 10 according to the embodiment of the present invention has the space heating portion 18 that heats the flying space of the coating liquid restricted by the air flow from the outside of the air flow formed by the air flow forming portion 16.

The space heating portion 18 of the spray device 10 in the example shown in the drawing has a cylindrical heat dissipating member 52 surrounding the cylindrical air flow formed by the air flow forming portion 16 and a heating device 54 that heats the heat dissipating member 52. Preferably, the center of the heat dissipating member 52 coincides with the center of the distal end surface of the ultrasonic spray 12, that is, the center of the air flow forming portion 16.

The heat dissipating member 52 may be made of a material having good thermal conductivity, such as various metals such as stainless steel, aluminum, and iron.

The heat dissipating member 52 emits radiation heat by being heated by the heating device 54. In the spray device 10, the flying space of the coating liquid restricted by the air flow is heated by the radiation heat generated by the heated heat dissipating member 52 from the outside of the cylindrical air flow formed by the air flow forming portion 16.

The spray device 10 according to the embodiment of the present invention is a device that forms a film on the substrate Z by performing spray coating with the coating liquid, including the air flow forming portion 16 and the space heating portion 18 described above, so that the coating liquid can be separately applied with good controllability and a dense organic substance film having high uniformity can be formed with a high film forming rate.

In the spray device according to the embodiment of the present invention, the space heating unit that heats the flying space of the coating liquid restricted by the air flow formed by the air flow forming portion 16 is not limited to those using radiation heat.

As the space heating unit, for example, a heating unit using electromagnetic induction, a heating unit using microwaves, and the like can also be used.

Figure 2:
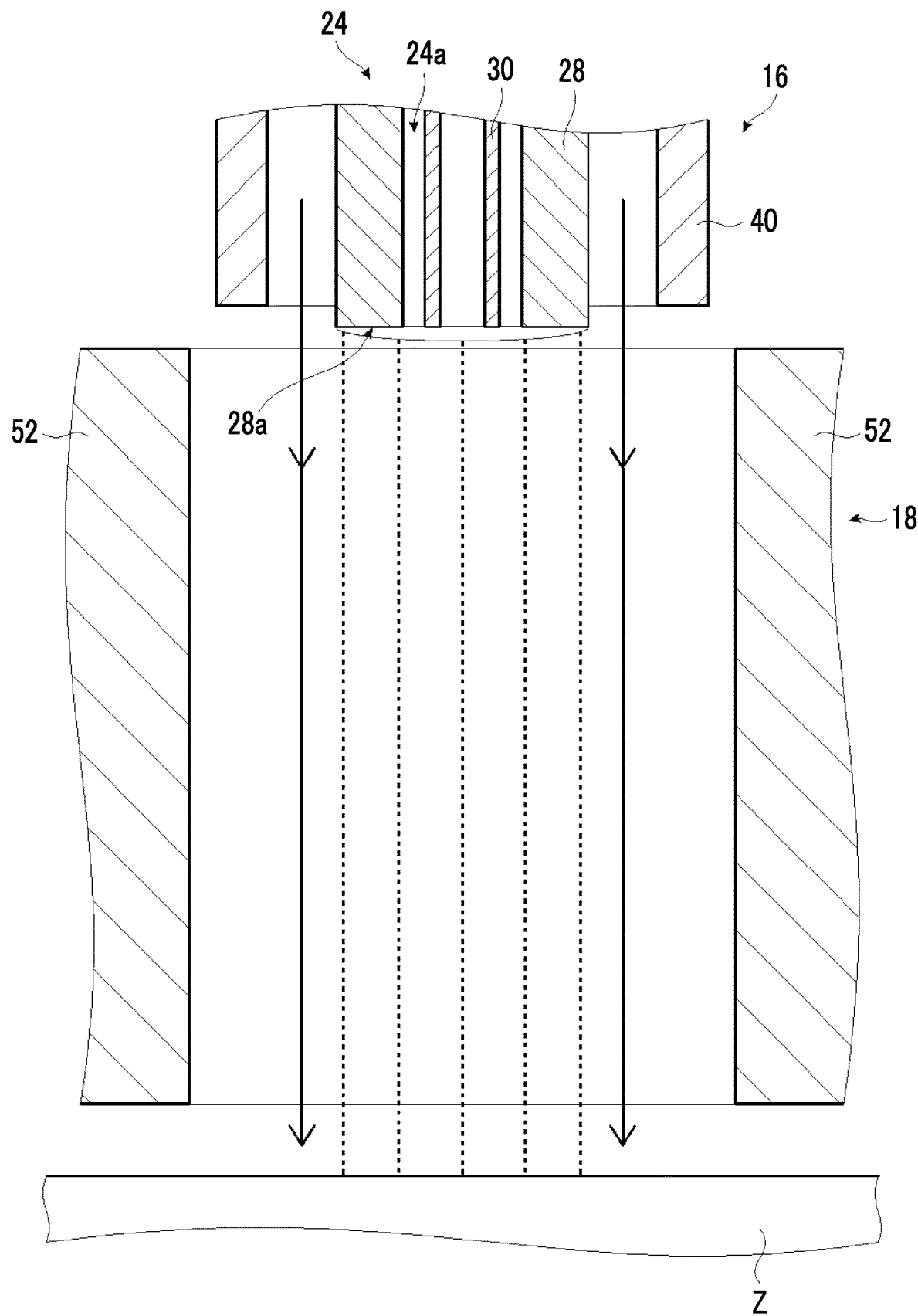
FIG. 2 is a schematic diagram for describing operations of the spray device shown in FIG. 1.

FIG. 2 schematically shows the vicinity of the distal end surface 28a of the ultrasonic spray 12 and the space heating portion 18 (heat dissipating member 52) in the spray device 10, and describes operations of the spray device 10 according to the embodiment of the present invention.

As described above, in the spray device 10, the coating liquid prepared by dissolving a material to be formed as a film in a solvent is supplied from the supply pipe 33 to the coating liquid flow path pipe 30 of the ultrasonic spray 12. As described above, the coating liquid flow path pipe 30 is inserted into the through hole 24a of the cylindrical housing 24 (body portion 26 and nozzle portion 28) so that their centers coincide.

The coating liquid reaches the distal end surface 28a of the ultrasonic spray 12 through the coating liquid flow path pipe 30, and spreads on the surface of the distal end surface 28a.

Here, the coating liquid is preferably prepared by heating. The coating liquid prepared by heating is heated by the coating liquid heating portion 34, supplied to the coating liquid flow path pipe 30, and supplied to the distal end surface 28a through the coating liquid flow path pipe 30. Accordingly, the coating liquid is supplied to the distal end surface 28a while maintaining an appropriate liquid state even in a case where the coating liquid has a concentration higher than a saturation concentration at normal temperature.

In a case where the coating of the substrate Z with the coating liquid is initiated, the housing 24 of the ultrasonic spray 12 is ultrasonically oscillated by the ultrasonic oscillation generating portion 26a. The coating liquid spread on the distal end surface 28a of the ultrasonic spray 12 is atomized by the ultrasonic oscillation of the housing 24, and sprayed from the distal end surface 28a of the ultrasonic spray 12. Only the housing 24 undergoes the ultrasonic oscillation, and the coating liquid flow path pipe 30 fixed to the connecting member 34a does not oscillate.

The coating liquid sprayed from the distal end surface 28a flies toward the substrate Z held by the substrate holder 20. The substrate Z is preferably heated.

Here, in the spray device 10, the air flow forming portion 16 forms a cylindrical air flow toward the substrate Z from the gap between the outer surface of the nozzle portion 28 and the inner surface of the air flow forming pipe 40, as shown by the arrows in FIG. 2. The flying space of the coating liquid sprayed from the ultrasonic spray 12 (distal end surface 28a) is restricted within the cylindrical air flow.

Accordingly, the coating liquid sprayed from the ultrasonic spray 12 flies in the flying space restricted by the air flow, and is applied to a predetermined position on the substrate Z.

On the substrate Z, the solvent evaporates from the coating liquid, so that the material dissolved in the solvent is precipitated and a film is formed. After being coated with the coating liquid, the substrate Z may be optionally heated using a heater or the like to further remove the solvent from the coating liquid.

Here, the flying space of the coating liquid restricted by the air flow is heated from the outside of the air flow by the radiation heat from the heat dissipating member 52 of the space heating portion 18.

In the formation of a film by spray coating, the spray device 10 according to the embodiment of the present invention restricts the flying space of the coating liquid by the air flow and heats the flying space from the outside of the air flow, so that the coating liquid can be separately applied with good controllability and a dense organic substance film having high uniformity can be formed with a high film forming rate.

That is, in the spray device 10 according to the embodiment of the present invention, the coating liquid is sprayed and ejected as atomized liquid droplets in the air, and the flying coating liquid is heated in a state of liquid droplets. Accordingly, the temperature of the liquid droplets of the coating liquid is increased, and the saturated solubility in the liquid droplets is thus raised. As a result, the coating liquid can be applied to the substrate Z without precipitation of crystals in the liquid droplets while maintaining a high concentration corresponding to the coating liquid prepared.

In addition, by evaporating, that is, removing the solvent from the liquid droplets of the flying coating liquid, the concentration of the liquid droplets, that is, the coating liquid can be further increased. Here, in the present invention, since the saturated solubility is high even in a case where the solvent is removed from the liquid droplets, it is possible to prevent the precipitation of crystals and the formation of aggregates. Moreover, in the present invention, since the coating liquid is heated in a state of flying liquid droplets, the entire liquid droplets are uniformly heated and the concentration is uniformly increased. In addition, since the surface tension is stable over the whole area, crystal nuclei are rarely formed. As a result, it is possible to prevent the formation of crystals and aggregates of the film forming material in the flying liquid droplets.

Furthermore, in the present invention, since the flying space of the coating liquid is restricted by the air flow and the restricted flying space is heated, the mist-like liquid droplets can be heated without being diffused. Thus, the efficiency of heating the coating liquid is high, and the above-described advantages can be more preferably obtained.

Therefore, according to the spray device 10 according to the embodiment of the present invention, the high-concentration coating liquid adheres to the substrate Z in a state of appropriate solution. As a result, the solvent rapidly evaporates from the coating liquid adhering to the substrate Z, and the film forming material is rapidly solidified. Thus, a uniform and dense film can be rapidly formed. Moreover, since the flying space of the coating liquid is restricted by the air flow, the coating liquid can be efficiently heated before the mist-like liquid droplets are diffused. In addition, since the flying space of the coating liquid is restricted by the air flow, separative application can be performed with good accuracy so that the coating liquid is applied only to a desired region on the substrate Z.

Moreover, in the spray device 10 according to the embodiment of the present invention, the flying space of the coating liquid is restricted by the air flow, and the flying space is heated by the space heating unit from the outside of the air flow. Therefore, it is possible to prevent the coating liquid from adhering to the space heating unit.

In a case where the flying coating liquid is not heated, crystals precipitate and aggregate in the liquid droplets of the flying coating liquid due to a decrease in temperature. As a result, a film to be obtained has many aggregates and is not uniform.

In addition, the spray device 10 according to the embodiment of the present invention preferably heats the substrate Z held by the substrate holder 20.

The liquid droplets of the coating liquid adhering to the substrate Z have a high concentration and are heated. Accordingly, in a case where the coating liquid adheres to the substrate Z, the solvent evaporates and crystals are rapidly formed. That is, the film forming rate can be further increased. Moreover, since the liquid droplets are also heated on the substrate Z, the droplets do not instantly crystallize immediately after adhesion, and can move in the plane direction of the substrate Z and be connected. As a result, a film can be uniformly formed in the plane direction, and the uniformity of the film can be further improved.

Considering the above facts, the spray device 10 according to the embodiment of the present invention is preferably used for forming a film of a material having low solubility in a solvent with a low-concentration coating liquid.

In addition, as a film to be formed, various films such as organic semiconductor films, insulating films, barrier films, various monomolecular films, and hard coats can be formed.

In the spray device 10 according to the embodiment of the present invention, the order of initiating the spraying of the coating liquid by the ultrasonic spray 12, initiating the formation of an air flow restricting the flying space of the coating liquid by the air flow forming portion 16, and initiating the heating of the flying space of the coating liquid by the space heating portion 18 is not limited.

However, in a case where the formation of an air flow restricting the flying space of the coating liquid is initiated after initiation of the spraying of the coating liquid, the coating liquid may adhere to the heat dissipating member 52 (space heating portion 18) and form a film in many cases. Accordingly, in the spray device 10 according to the embodiment of the present invention, the spraying of the coating liquid by the ultrasonic spray 12 is preferably initiated after initiation of the formation of the air flow by the air flow forming portion 16. That is, the spray device 10 may have a control unit that controls the driving of each part so that in a case where the spraying of the coating liquid is initiated, the spraying of the coating liquid by the ultrasonic spray 12 is initiated after initiation of the formation of the air flow by the air flow forming portion 16.

In the spray device 10 according to the embodiment of the present invention, the space heating portion 18 heats the flying space of the coating liquid from the outside of the air flow restricting the flying space of the coating liquid formed by the air flow forming portion 16.

Accordingly, the space heating portion 18, particularly the heat dissipating member 52 that heats the flying space of the coating liquid, is a separate member that is not related to the ultrasonic spray 12 and the air flow forming portion 16. Accordingly, in the spray device 10 according to the embodiment of the present invention, the ultrasonic spray 12 and the air flow forming portion 16 are preferably not in contact with the space heating portion 18 (heat dissipating member 52) as in the example shown in the drawing in consideration of the stability of the air flow, the prevention of the coating liquid from adhering to the heat dissipating member 52, the control of the temperature of each member, and the like.

In addition, the heat dissipating member 52 heats the flying space of the coating liquid only, and is not related to the restriction of the flying space of the coating liquid.

That is, in a case where the flying space of the coating liquid is restricted by the member surrounding the flying space of the coating liquid, it is better to bring the member into contact with the substrate Z since the flying space of the coating liquid can be more accurately restricted and the coating liquid can be applied to a target position on the substrate Z to form a film.

However, in the spray device 10 according to the embodiment of the present invention, the air flow defines the flying space of the coating liquid, and the heat dissipating member 52 is not related to the restriction of the flying space of the coating liquid. Accordingly, the heat dissipating member 52 is not required to be in contact with the substrate Z.

Here, as described above, since the spray device 10 according to the embodiment of the present invention restricts the flying space of the coating liquid by the air flow, it can perform separative application so that the coating liquid is applied to a desired position on the substrate Z. In this case, as will be described later, the spray device 10 preferably has a moving unit that three-dimensionally moves the ultrasonic spray 12, the air flow forming portion 16, and the space heating portion 18 (heat dissipating member 52).

In consideration of this fact, in the spray device 10 according to the embodiment of the present invention, the heat dissipating member 52 is preferably always disposed so as to be spaced apart from the substrate Z.

In the spray device 10 according to the embodiment of the present invention, the heating temperature of the flying space of the coating liquid by the space heating portion 18 is not limited, and may be appropriately set according to the solvent contained in the coating liquid, the film forming material, the concentration of the coating liquid, and the like.

In the spray device 10 according to the embodiment of the present invention, the heating device 54 that heats the heat dissipating member 52 is not limited, and various types can be used.

For example, the heating device 54 may be a cartridge heater built in the heat dissipating member 52.

Otherwise, as in the example shown in the drawing, the heating device 54 may be disposed outside the heat dissipating member 52 to circulate a heat medium such as an oil heated in a path that is in contact with the heat dissipating member 52.

Furthermore, a configuration in which the heat dissipating member 52 itself generates heat may also be provided. For example, the heat dissipating member 52 is made of a material having a large electric resistance and is energized to generate Joule heat, so that the heat dissipating member 52 is heated. As another method, the heat dissipating member 52 is made of a material that can be induction-heated and a magnetic field is applied to the heat dissipating member 52, so that the heat dissipating member 52 is heated.

The heating device 54 circulating the heat medium and the configuration in which the heat dissipating member 52 itself generates heat are thought to relatively easily secure safety even in a case where a flammable solvent is used for the coating liquid.

In order to efficiently heat the flying space of the coating liquid, the heat dissipating member 52 preferably has good heat dissipating properties and good heating efficiency.

In consideration of this fact, the heat dissipating member 52 is preferably a black member. Specifically, the heat dissipating member 52 preferably has an emissivity ε of 0.90 or more, and more preferably 0.95 or more. Accordingly, the heating efficiency and the heat dissipating properties of the heat dissipating member 52 can be improved, and thus the efficiency of heating the flying space of the coating liquid can be improved.

In addition, the heat dissipating member 52 also preferably has a roughened surface. Accordingly, the surface area of the heat dissipating member 52 can be increased, the heating efficiency and the heat dissipating properties of the heat dissipating member 52 can be improved, and thus the efficiency of heating the flying space of the coating liquid can be improved. Known methods can be used for the roughening treatment. Examples of the roughening treatment include knurling, sandblasting, and shot peening.

Figure 3:
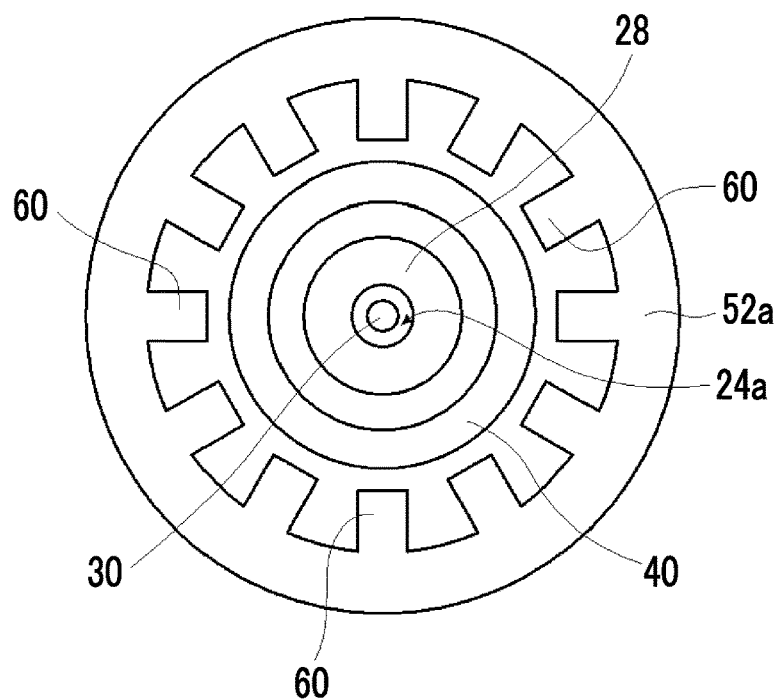
FIG. 3 is a diagram schematically showing another example of a heat dissipating member.
Figure 4:
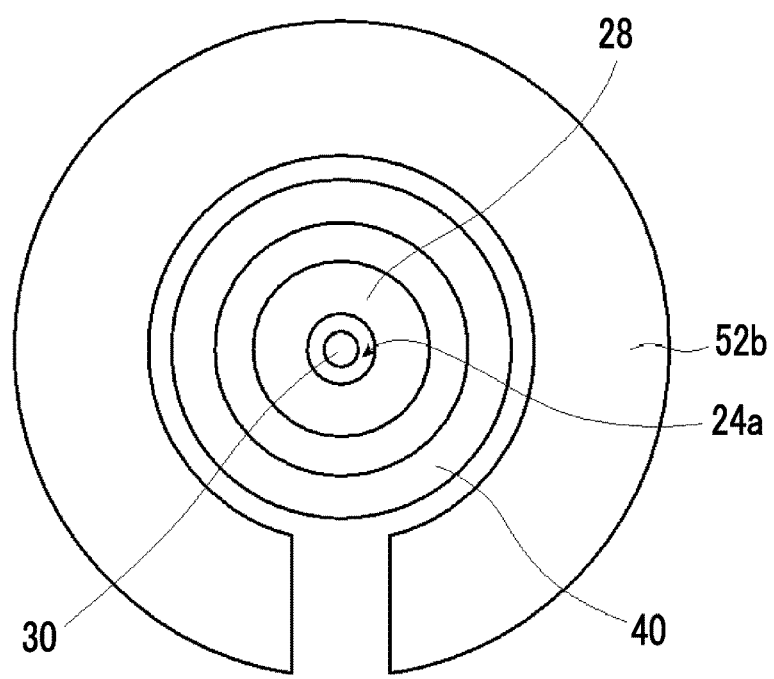
FIG. 4 is a diagram schematically showing a further example of the heat dissipating member.
Figure 5:
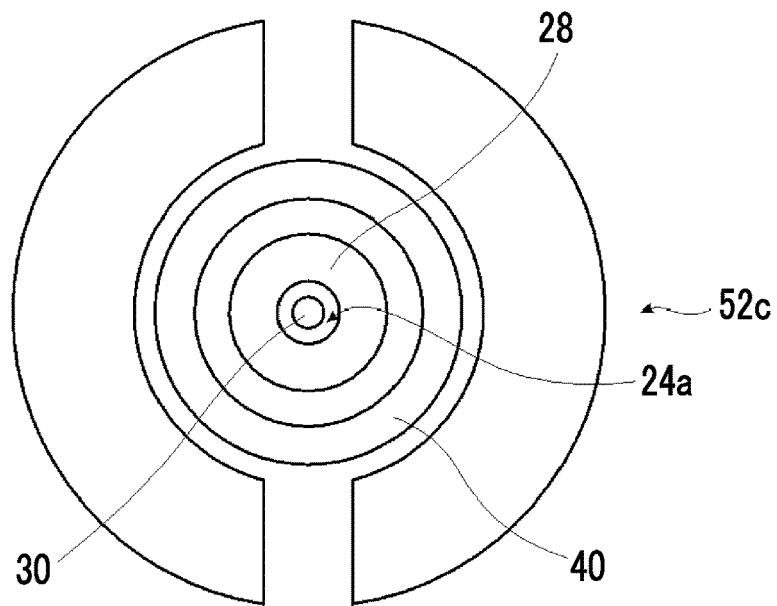
FIG. 5 is a diagram schematically showing a still further example of the heat dissipating member.
Figure 6:
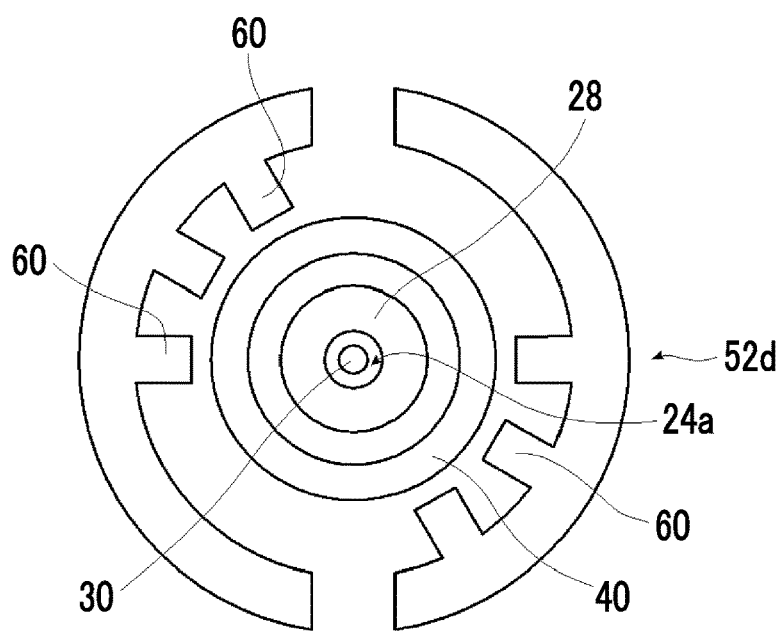
FIG. 6 is a diagram schematically showing a still further example of the heat dissipating member.
Figure 7:
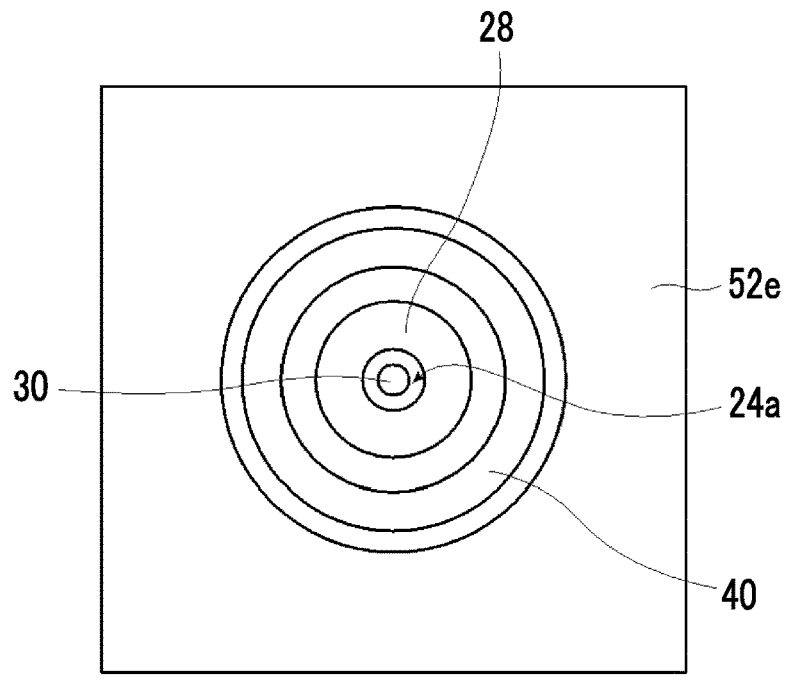
FIG. 7 is a diagram schematically showing a still further example of the heat dissipating member.
Figure 8:
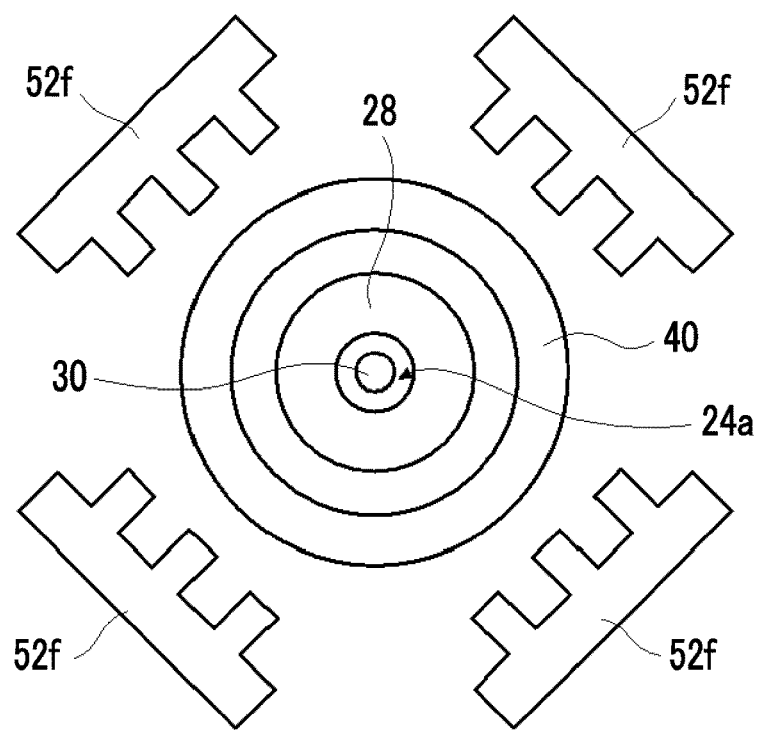
FIG. 8 is a diagram schematically showing a still further example of the heat dissipating member.

Furthermore, a method in which irregularities are formed on the surface of the heat dissipating member 52 and the surface area is made not less than twice the projection area is also included. For example, fins 60 protruding toward the flying space of the coating liquid are provided on an inner surface as in a heat dissipating member 52a schematically shown in FIG. 3. Accordingly, the surface area of the heat dissipating member 52 is increased, the heating efficiency and the heat dissipating properties of the heat dissipating member 52 can be improved, and thus the efficiency of heating the flying space of the coating liquid can be improved.

FIGS. 3 and 4 to 8 to be described later are diagrams schematically showing the ultrasonic spray 12 (nozzle portion 28) and the air flow forming pipe 40 viewed from the side of the substrate Z. In addition, in FIGS. 3 to 8, the coating liquid flow path pipe 30 is shown by a solid-line circle for the sake of brevity.

Two or more of the configuration in which the emissivity ε of the heat dissipating member 52 is 0.90 or more, the configuration in which the surface of the heat dissipating member 52 is roughened, and the configuration in which the surface area of the heat dissipating member 52 is made not less than twice the projection area may be used in combination.

The shape of the heat dissipating member is not limited to the cylindrical shape shown in FIGS. 1 and 2, and various shapes can be used.

For example, as schematically shown in FIG. 4, a heat dissipating member 52*b* having a slit-like opening in an axial direction of the cylinder and having a Landolt ring-like cross-sectional shape is provided. The axial direction of the cylinder is a height direction of the cylinder. According to the heat dissipating member 52*b*, the flying state of the coating liquid and the like can be observed from the slit-like opening.

In addition, as schematically shown in FIG. 5, a heat dissipating member 52*c* having a combination of a pair of substantial semicylinders provided by dividing a cylinder into two in an axial direction can also be used. According to the heat dissipating member 52*c*, while light for observation is applied from one gap, the flying state of the coating liquid and the like can be observed from the other gap.

Furthermore, as schematically shown in FIG. 6, a heat dissipating member 52*d* consisting of a pair of substantial semicylinders provided by dividing a cylinder into two in an axial direction and is configured to improve the heating efficiency at positions that are substantially in point symmetry can also be used. In the example shown in the drawing, fins 60 are provided at positions that are in point symmetry with the two semicylinders divided into two in a circumferential direction.

According to this configuration, a gentle air flow is generated between the heat dissipating member 52*d* and the air flow restricting the flying space of the coating liquid due to the difference in heat dissipating efficiency. As a result, a high-temperature region and a low-temperature region generated partially can be eliminated, the temperature between the heat dissipating member 52*d* and the air flow can be equalized, and thus the efficiency of heating by the heat dissipating member 52*d* can be improved.

In the above examples, the heat dissipating members are all cylindrical (substantially cylindrical), that is, circular tubular, but the present invention is not limited thereto.

For example, as schematically shown in FIG. 7, a heat dissipating member 52*e* provided with a circular through hole 62 penetrating from an upper surface to a lower surface at a center of a rectangular parallelepiped or a cube can also be preferably used.

In each of the above-described heat dissipating members, the center of the cylinder, the substantial cylinder, or the circular through hole preferably coincides with the center of the distal end surface of the ultrasonic spray 12, that is, the center of the air flow forming pipe 40 as in the heat dissipating member 52 shown in FIGS. 1 and 2.

The cylindrical heat dissipating member as described above is preferable since the periphery of the air flow restricting the flying space of the coating liquid can be evenly heated. However, in the spray device according to the embodiment of the present invention, the shape of the heat dissipating member is not limited to a cylindrical shape (tubular shape, substantially tubular shape) as described above.

For example, as schematically shown in FIG. 8, a block-like heat dissipating member 52*f* may be provided so as to surround a cylindrical air flow restricting the flying space of the coating liquid in a circumferential direction, thereby heating the flying space of the coating liquid.

In addition, in the spray device 10 according to the embodiment of the present invention, the heat dissipating member 52 may be provided with a gas supply unit to supply a small amount of a stirring gas for stirring the air between the heat dissipating member 52 and the air flow restricting the flying space of the coating liquid. Examples of the stirring gas include the same gas as that forming the air flow restricting the flying space of the coating liquid. In addition, the stirring gas is preferably a high-temperature gas heated by the heat dissipating member 52. Furthermore, the stirring gas supply unit may be provided at a plurality of positions that are in point symmetry with respect to the center of the distal end surface 28a of the ultrasonic spray 12.

According to this configuration, the air between the heat dissipating member 52 and the air flow restricting the flying space of the coating liquid can be gently stirred, a high-temperature region and a low-temperature region generated partially can be eliminated, the temperature between the heat dissipating member 52 and the air flow can be equalized, and thus the efficiency of heating by the heat dissipating member 52 can be improved.

Furthermore, a gas supply port of the stirring gas supply unit provided in the heat dissipating member 52 is preferably made of a porous material such as a sintered metal. Accordingly, the stirring gas supplied from the heat dissipating member 52 can be made more gentle, and the influence on the air flow restricting the flying space of the coating liquid can be significantly reduced.

The supply of the stirring gas from the gas supply unit provided in the heat dissipating member 52 may be appropriately controlled according to the driving state of the spray device 10.

For example, in a case where the stirring gas is supplied from the heat dissipating member 52, the air flow restricting the flying space of the coating liquid may be disturbed. In a case where such disturbance is detected in the air flow, controls such as stopping the supply of the stirring gas from the heat dissipating member 52 or reducing the supply amount may be performed.

The disturbance in the air flow restricting the flying space of the coating liquid may be detected by, for example, a fluctuation of the coating position of the coating liquid on the substrate Z. In addition, the supply of the stirring gas may be controlled by known methods such as opening and closing of a solenoid valve.

In addition, as will be described later, the spray device 10 according to the embodiment of the present invention preferably has a moving unit that three-dimensionally moves the ultrasonic spray 12, the air flow forming portion 16, and the space heating portion 18.

In the spray device 10, the ultrasonic spray 12 and the like may be moved while the coating with the coating liquid is performed. Otherwise, the ultrasonic spray 12 and the like may be moved while the coating with the coating liquid is stopped. Accordingly, the supply of the stirring gas from the heat dissipating member 52 may be stopped during the coating with the coating liquid, and the stirring gas may be supplied from the heat dissipating member 52 while the coating with the coating liquid is stopped. In a case where the stirring gas is supplied while the coating with the coating liquid is stopped, the flow rate may be increased to improve the efficiency of stirring the air between the heat dissipating member 52 and the air flow restricting the flying space of the coating liquid.

Furthermore, the temperature of the flying space of the coating liquid restricted by the air flow formed by the air flow forming portion 16 may be measured, and the supply of the stirring gas from the gas supply unit provided in the heat dissipating member 52 may be controlled according to the result of the temperature measurement.

The stirring gas supplied from the heat dissipating member 52 is basically a high-temperature gas heated by the heat dissipating member 52. Accordingly, the supply of the stirring gas may be controlled according to the result of the temperature measurement of the flying space of the coating liquid so that in a case where the temperature is too low, the stirring gas is supplied from the heat dissipating member 52, and in a case where the temperature of the flying space is sufficiently high, the supply of the stirring gas is stopped.

As described above, the spray device 10 according to the embodiment of the present invention can also apply the coating liquid to the substrate Z by three-dimensionally moving the ultrasonic spray 12 and the like. Here, in the movement of the ultrasonic spray 12 and the like, the temperature of the flying space may be reduced since external air at room temperature flows into the flying space of the coating liquid. For example, controlling the supply of the stirring gas from the heat dissipating member 52 as described above is effective in such a case.

As described above, since the spray device 10 according to the embodiment of the present invention restricts the flying space of the coating liquid by the air flow, it can separately apply the coating liquid with good controllability and can also perform the selective formation of a film in a desired region on the substrate Z or the like with high accuracy and controllability.

Accordingly, the spray device 10 according to the embodiment of the present invention preferably has a moving unit that three-dimensionally moves the ultrasonic spray 12, the air flow forming portion 16, and the space heating portion 18 (heat dissipating member 52) in, for example, an x-direction that is the lateral direction in FIG. 1, a y-direction that is the direction orthogonal to the surface of FIG. 1, and a z-direction that is the vertical direction in FIG. 1.

By providing such a moving unit, a film can be formed on the substrate Z having a large area. In addition, a film can also be formed so as to draw an optional pattern.

Furthermore, the movement of the ultrasonic spray 12 and the like can also be performed during the formation of the film, that is, during the coating of the substrate Z with the coating liquid. Here, since the spray device 10 according to the embodiment of the present invention restricts the flying space of the coating liquid by the air flow, it can prevent the movement of the ultrasonic spray 12 and the like from affecting the flying of the coating liquid. In particular, as shown in the example shown in the drawing, the cylindrical (tubular) heat dissipating member 52 surrounds the flying space of the coating liquid, so that the influence of the movement of the ultrasonic spray 12 and the like on the flying of the coating liquid can be extremely reduced.

The unit that moves the ultrasonic spray 12, the air flow forming portion 16, and the space heating portion 18 is not limited. Known various structure moving units can be used as long as the above members can be three-dimensionally moved.

In addition, the moving unit may three-dimensionally individually move the ultrasonic spray 12, the air flow forming portion 16, and the space heating portion 18. However, preferably, the moving unit three-dimensionally integrally moves the ultrasonic spray 12, the air flow forming portion 16, and the space heating portion 18.

There is no limitation on the control of the movement of the ultrasonic spray 12, the air flow forming portion 16, and the space heating portion 18 by the moving unit.

Accordingly, the ultrasonic spray 12 and the like may be continuously moved. Otherwise, the movement of the ultrasonic spray 12 and the like may be controlled so that the coating while stopping the movement and the movement while stopping the coating are alternately performed. Otherwise, the movement of the ultrasonic spray 12 and the like may be controlled so that the movement while performing the coating and the movement while stopping the coating are alternately performed. Otherwise, the movement of the ultrasonic spray 12 and the like may be controlled so that the coating while performing the movement and the stoppage of the coating and the movement are alternately performed. Otherwise, the movement of the ultrasonic spray 12 and the like may be controlled so that the above methods are appropriately combined.

In addition, for example, in a case where the ultrasonic spray 12 and the like are moved, the moving rate may be appropriately adjusted so that the moving rate in a case where the coating is stopped is made faster than the moving rate during the coating, or the moving rate is changed during the coating and/or the stoppage of the coating.

Furthermore, the film thickness of a film to be formed may be adjusted by adjusting the moving rate of the ultrasonic spray 12 and the like in the x-y-direction during the coating with the coating liquid.

In the spray device 10 according to the embodiment of the present invention, there are no limitations on the movement of the ultrasonic spray 12, the air flow forming portion 16, and the space heating portion 18.

That is, in the spray device 10 according to the embodiment of the present invention, the ultrasonic spray 12, the air flow forming portion 16, and the space heating portion 18 may be fixed, and the substrate holder 20 may be two-dimensionally or three-dimensionally movable.

In a case where the substrate Z is a long sheet-like material in the formation of a film on the substrate Z by the spray device 10 according to the embodiment of the present invention, R to R (roll to roll) can also be used.

As is well known, R to R is a manufacturing method in which from a roll around which a substrate Z is wound, the substrate is delivered to perform a process such as film formation while the substrate Z is transported in a longitudinal direction, and the substrate Z subjected to the process is wound in a roll shape.

In a case where the spray device according to the embodiment of the present invention is used for R to R, a film to be formed may be a film that is uniform in the plane direction, what is called a solid film, or a film that is regularly or irregularly patterned.

Although the spray device according to the embodiment of the present invention has been described above in detail, the present invention is not limited to the above aspects, and various improvements and modifications may be made without departing from the gist of the present invention.

EXAMPLES

Hereinafter, the present invention will be described below in detail with reference to examples. The present invention is not limited to the following specific examples.

Example 1

<Production of Substrate>
<<Base>>
As a base, a polyethylene naphthalate film (TEONEX Q65, manufactured by TEIJIN LIMITED) having no undercoat layer having a thickness of 100 μm was prepared.
<<Formation of Gate Electrode>>
A mask was placed on a surface of the base, and sputtering was performed using gold as a target to form a thin gold film having a thickness of 50 nm as a gate electrode.
<<Formation of Gate Insulating Film>>
Sputtering was performed using a silicon oxide ($SiO_2$) as a target so as to cover the whole surface of the base, and thus a silicon oxide film having a thickness of 1,000 nm was formed as a gate insulating film.

<<Formation of SAM Film>>
In order to control a contact angle of the gate insulating film, a trimethoxy(2-phenylethyl)silane film was formed as a SAM film on a surface of the gate insulating film.

1 mL of trimethoxy(2-phenylethyl)silane (manufactured by Tokyo Chemical Industry Co., Ltd.) was put in a 3 mL (liter) vial bottle. Next, the vial bottle and the substrate in which the gate insulating layer was formed were put in an oven at 130° C. and heated for 3 hours. Accordingly, the trimethoxy(2-phenylethyl)silane in the vial bottle evaporates, and a SAM film consisting of trimethoxy(2-phenylethyl)silane is formed on the gate insulating film.

In order to remove the extra SAM film, toluene was put in an ultrasonic washing device, and the substrate in which the SAM film was formed was immersed in the toluene and washed for 5 minutes. Furthermore, isopropyl alcohol was put in another ultrasonic washing device, and the substrate in which the SAM film was formed was washed and rinsed for 5 minutes.

The substrate in which the SAM film was formed was dried for about 3 minutes by a dryer to remove the rinsing liquid. Using a contact angle meter, it was confirmed that a contact angle of the substrate in which the SAM film was formed was 70°.

A work-in-process corresponding to a bottom gate-top contact type organic thin film transistor in which the gate electrode, the gate insulating film, and the SAM film were formed on the surface of the base, produced as above, was used as a substrate Z.

<Spray Device>
A spray device 10 having the configuration schematically shown in FIG. 1 was produced.

AccuMist manufactured by SONO-TEK Corporation was prepared as an ultrasonic spray head.

A housing 24 of the ultrasonic spray head has a cylindrical shape made of a titanium alloy. The housing 24 has a circular distal end having a diameter of 3.0 mm, and has a through hole 24a opened at a center of the distal end and having a diameter of 1.0 mm. Accordingly, a distal end surface 28a of an ultrasonic spray 12 has a circular shape having a diameter of 3.0 mm.

In addition, a cylindrical coating liquid flow path pipe 30 made of stainless steel and having an outer diameter of 0.95 mm and an inner diameter of 0.6 mm is inserted into the through hole 24a of the housing 24.

A distal end of the coating liquid flow path pipe 30 is housed about 0.9 mm inward from the distal end of the housing 24.

A silicon tube was connected as a supply pipe 33 to a coating liquid flow path pipe 30 of the ultrasonic spray 12. A 10 mL (liter) syringe pump was connected to an open end of the supply pipe 33.

A ribbon heater was wound around the bonding portion between the supply pipe 33 and the ultrasonic spray 12 to provide a coating liquid heating portion 34.

A hollow columnar casing 14 made of stainless steel was prepared. A through hole was provided at centers of upper and lower surfaces of the casing 14 to fix the ultrasonic spray 12. In addition, an inflow port 14a and a discharge port 14b for allowing air adjusting temperatures of an ultrasonic oscillation generating portion 26a and the casing 14 to flow were provided in the upper surface of the casing 14 so as to be opposed to each other with the ultrasonic spray 12 interposed therebetween.

A hollow columnar chamber 38 made of stainless steel and having one opening surface was prepared. A circular opening 38a having a diameter of 5 mm was formed at a center of a closed surface of the chamber 38. The opening surface of the chamber 38 was engaged with the casing 14 on the side of the substrate Z so that an end portion of the casing 14 is inserted, and the chamber 38 was thus fixed to the casing 14. An O-ring was put on the contact surface between the casing 14 and the chamber 38. In addition, the center of the opening 38a of the chamber 38 and the center of the coating liquid flow path pipe 30 (that is, distal end surface 28a) of the ultrasonic spray 12 were allowed to coincide.

In addition, a through hole was provided in a side surface of the chamber 38, and a supply pipe 42 supplying an air flow forming gas was connected thereto. A ribbon heater was wound around the supply pipe 42 to provide a gas heating portion 50.

Furthermore, a cylindrical air flow forming pipe 40 having an inner diameter of 4 mm was fixed to the lower surface of the chamber 38 so that a center thereof coincided with a center of the opening 38a. The fixing was performed by an adhesive using a flange portion 40a provided at one end portion of the air flow forming pipe 40. The air flow forming pipe 40 had a length so that the ultrasonic spray 12 on the side of the distal end surface 28a protruded by 0.5 mm.

Accordingly, an air flow forming portion 16 was constituted.

As described above, the distal end surface 28a of the ultrasonic spray 12 has a diameter of 3.0 mm. In addition, the center of the distal end surface 28a of the ultrasonic spray 12 and the center of the opening 38a, that is, the air flow forming pipe 40 are allowed to coincide. Accordingly, a gap of 0.5 mm is provided over the whole circumference between the nozzle portion 28 of the ultrasonic spray 12 and the inner circumferential surface of the air flow forming pipe 40. An air flow forming gas restricting the flying space of the coating liquid is released from the gap, and a cylindrical air flow is formed.

An aluminum cylinder having an inner diameter of 12 mm, a thickness of 30 mm, and a height of 38 mm and treated with black alumite was prepared as a heat dissipating member 52.

The heat dissipating member 52 was disposed at a position 0.1 mm distant from the distal end surface 28a of the ultrasonic spray 12 on the side of the substrate Z so that a center thereof coincided with the center of the distal end surface 28a of the ultrasonic spray 12.

An electric heater and a thermocouple were installed at four positions around the heat dissipating member 52 at intervals of 90° in a circumferential direction to heat the heat dissipating member 52, so that a space heating portion 18 was constituted.

A hot plate was prepared as a substrate holder 20. That is, the spray device 10 comprises a unit that heats the substrate Z.

In addition, the spray device disposed on the substrate holder 20 was connected to an XYZ positioning stage and was relatively movable with respect to the substrate Z at an optional speed.

By adjusting a Z-axis of the XYZ positioning stage, the distance between the distal end surface 28a of the ultrasonic spray 12 and the substrate Z was adjusted to 40 mm. Accordingly, the heat dissipating member 52 and the substrate Z are spaced apart from each other.

<Preparation of Coating Liquid>

A coating liquid having a concentration of 1 mass % was prepared by dissolving an organic semiconductor material (C8-BTBT, manufactured by Sigma-Aldrich Co. LLC) in toluene. The temperature of the coating liquid was 60° C.

<Formation of Film>

Using such a spray device and a coating liquid, a film of an organic semiconductor material was formed on the substrate Z in which the gate electrode, the gate insulating film, and the SAM film were formed.

The temperature of the substrate Z was adjusted to 80° C. by the substrate holder 20 (hot plate). In addition, the ultrasonic spray 12 was heated by supplying a heating gas at 60° C. into the casing 14 from an inflow port 14a.

Then, the supply of a gas forming an air flow restricting the flying space of the coating liquid was initiated from the supply pipe 42. A nitrogen gas was used as the gas. The amount of the gas supplied was 1 L/min. The velocity of the air flow directly below the air flow forming pipe 40 was 0.1 m/sec. The air flow forming gas was heated to 60° C. by the gas heating portion 50 (small amount gas heater, manufactured by SHINNETSU CO., LTD.).

After initiation of the supply of the air flow forming gas, the supply of the coating liquid from the syringe pump to the ultrasonic spray 12 was initiated. The amount of the coating liquid supplied was 0.5 mL/min. The coating liquid was heated to 60° C. by the coating liquid heating portion 34 (ribbon heater).

At the same time, the heat dissipating member 52 was heated by a heating device 54 (infrared heater) so that the temperature of the flying space of the coating liquid restricted by the air flow was 60° C.

Next, an ultrasonic oscillator was driven to ultrasonically oscillate the ultrasonic spray 12 at a frequency of 120 kHz, and the spraying of the coating liquid was initiated.

Simultaneously with the initiation of the spraying of the coating liquid, the spray device was linearly moved with respect to the substrate Z at a speed of 10 mm/sec by the XYZ positioning stage.

Accordingly, a coating film having a width of 10 mm and a length of 100 mm was formed.

After formation of the coating film, the substrate was heated in an oven at 130° C. for 10 minutes to remove the residual solvent, and an organic semiconductor film (C8-BTBT film) was completed.

Example 2

The same spray device as in Example 1 was produced, except that the coating liquid heating portion 34 was not provided.

An organic semiconductor film was formed in the same manner as in Example 1, except that the above spray device was used. That is, in this example, the coating liquid cannot be heated.

Example 3

The same spray device as in Example 1 was produced, except that the gas heating portion 50 was not provided.

An organic semiconductor film was formed in the same manner as in Example 1, except that the above spray device was used. That is, in this example, the gas forming the air flow restricting the flying space of the coating liquid cannot be heated.

Example 4

The same spray device as in Example 1 was produced, except that instead of the hot plate, a plate-like placing stand having no heating mechanism was used as the substrate holder 20.

An organic semiconductor film was formed in the same manner as in Example 1, except that the above spray device was used. That is, in this example, the substrate Z cannot be heated.

Example 5

The same spray device as in Example 1 was produced, except that the coating liquid heating portion 34 and the gas heating portion 50 were not provided, and a plate-like placing stand having no heating mechanism was used instead of the hot plate.

An organic semiconductor film was formed in the same manner as in Example 1, except that the above spray device was used. That is, in this example, the coating liquid, the gas forming the air flow restricting the flying space of the coating liquid, and the substrate Z cannot be heated.

Comparative Example 1

The same spray device as in Example 1 was produced, except that the air flow forming portion 16 was not provided.

An organic semiconductor film was formed in the same manner as in Example 1, except that the above spray device was used. That is, in this example, the gas for forming the air flow cannot be supplied. That is, the flying space of the coating liquid cannot be restricted.

Comparative Example 2

The same spray device as in Example 1 was produced, except that the space heating portion 18 was not provided.

An organic semiconductor film was formed in the same manner as in Example 1, except that the above spray device was used. That is, in this example, the flying space of the coating liquid cannot be heated from the outside of the air flow.

[Evaluation]

The formed organic semiconductor film was evaluated as follows.

<Uniformity of Film>

The formed organic semiconductor film was observed by a differential interference microscope to observe the uniformity of the film and the formation of aggregates. At five positions optionally selected within 1 mm square field of view of the microscope, the evaluation was performed as follows.

A state in which the film was formed as a single uniform film and was crystalline was rated A, a state in which the film was mostly uniform and continuous was rated B, a state in which the film was partially uniform was rated C, a state in which the film was intermittently connected was rated D, and a state in which aggregates were often observed was rated E.

<Measurement of Mobility>

Copper was vacuum-deposited on the formed organic semiconductor film to form a source electrode and a drain electrode, and an organic thin film transistor was thus produced.

Each of the source electrode and the drain electrode had a channel length of 50 μm, a thickness of 30 nm, and a channel width of 1 mm.

The carrier mobility of the produced organic thin film transistor was measured by the following method.

A voltage of −40 V was applied between the source electrode and the drain electrode to change a gate voltage in a range of 40 V to −40 V, and carrier mobility μ was calculated using the following expression representing a drain current Id.

$$Id = (w/2L)\mu Ci(Vg-Vth)^2$$

(In the expression, L represents a gate length, w represents a gate width, Ci represents a capacity per unit area of the insulating layer, Vg represents a gate voltage, and Vth represents a threshold voltage)

The results are shown in the following table.

Regarding the thickness of the organic semiconductor film, a step at an end portion of the organic semiconductor film was measured by an atomic force microscope, and a height of the step was defined as the film thickness.

TABLE 1

| | Formation of Air Flow | Space Heating | Heating | | | Evaluation | | |
|---|---|---|---|---|---|---|---|---|
| | | | Coating Liquid | Gas | Substrate | Uniformity | Film Thickness | Mobility |
| Example 1 | formed | heated | heated 60° C. | heated 60° C. | heated 80° C. | A | 100 nm | 1.4 |
| Example 2 | formed | heated | not heated 25° C. | heated 60° C. | heated 80° C. | B | 70 nm | 0.73 |
| Example 3 | formed | heated | heated 60° C. | not heated 25° C. | heated 80° C. | B | 73 nm | 0.79 |
| Example 4 | formed | heated | heated 60° C. | heated 60° C. | not heated 25° C. | B | 68 nm | 0.7 |
| Example 5 | formed | heated | not heated 25° C. | not heated 25° C. | not heated 25° C. | C | 40 nm | 0.24 |
| Comparative Example 1 | formed | not heated | heated 60° C. | heated 60° C. | heated 80° C. | E | 10 nm | 0.01 |
| Comparative Example 2 | not formed | heated | heated 60° C. | heated 60° C. | heated 80° C. | E | 1 nm | 0.001 |

The air flow formation refers to the formation of an air flow restricting the flying space of the coating liquid.

The space heating refers to the heating of the flying space of the coating liquid.

The heating of gas refers to the heating of the gas forming the air flow restricting the flying space of the coating liquid.

As shown in the above table, according to the present invention in which the flying space of the coating liquid is restricted by the air flow and heated from the outside of the air flow, a film having high uniformity can be formed at a high forming rate. Accordingly, the formed organic semiconductor film also has high mobility.

In addition, as shown in Examples 2 to 4, in a case where the coating liquid, the gas forming the air flow restricting the flying space of the coating liquid, or the substrate is heated, the above-described effects can be more preferably obtained. In particular, as shown in Example 1, in a case where the coating liquid, the gas forming the air flow restricting the flying space of the coating liquid, and the substrate are all heated, the above-described effects can be extremely preferably obtained.

In contrast, in Comparative Example 1 in which the flying space of the coating liquid is not heated, the solvent cannot be sufficiently removed from the coating liquid during flying, and thus the film uniformity is poor and the film thickness is small. As a result, the formed organic semiconductor film also has low mobility.

Furthermore, in Comparative Example 2 in which the flying space of the coating liquid is not restricted by the air flow, the coating liquid is scattered here and there, and thus the film uniformity is poor and the film thickness is also extremely small. As a result, the formed organic semiconductor film also has extremely low mobility.

From the above results, the effects of the present invention are clear.

The present invention can be preferably used for forming various films such as an organic substance film such as an organic semiconductor film.

EXPLANATION OF REFERENCES

10: spray device
12: ultrasonic spray
14: casing
14a: inflow port
14b: discharge port
16: air flow forming portion
18: space heating portion
20: substrate holder
24: housing
26: body portion
26a: ultrasonic oscillation generating portion
28: nozzle portion
28a: distal end surface
30: coating liquid flow path pipe
33, 42: supply pipe
34: coating liquid heating portion
34a: connecting member
38: chamber
38a: opening
40: air flow forming pipe
40a: flange portion
50: gas heating portion
52, 52a, 52b, 52c, 52d, 52e, 52f: heat dissipating member
54: heating device
60: fin
Z: substrate

What is claimed is:

1. A spray coating method comprising:
spraying a coating liquid to a coating material,
forming a cylindrical air flow for restricting a flying space of the coating liquid sprayed by the spraying; and
coating the coating material with the coating liquid while heating the flying space of the coating liquid from outside of the cylindrical air flow for restricting the flying space using a heat dissipating member surrounding the cylindrical air flow for restricting the flying space of the coating liquid and a heating device that heats the heat dissipating member,
wherein the heat dissipating member has at least one configuration of a first configuration of being a black member and a second configuration of having a roughened surface.

* * * * *